United States Patent
Treder et al.

(10) Patent No.: US 9,618,058 B2
(45) Date of Patent: Apr. 11, 2017

(54) ACTUATOR SYSTEM FOR HYDRAULIC ACTUATION

(71) Applicant: Schaeffler Technologies GmbH & Co. KG, Herzogenaurach (DE)

(72) Inventors: Marco Treder, Buehl (DE); Reinhard Stehr, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/394,809

(22) PCT Filed: Mar. 25, 2013

(86) PCT No.: PCT/EP2013/056281
§ 371 (c)(1),
(2) Date: Oct. 16, 2014

(87) PCT Pub. No.: WO2013/156269
PCT Pub. Date: Oct. 24, 2013

(65) Prior Publication Data
US 2015/0096864 A1   Apr. 9, 2015

(30) Foreign Application Priority Data

Apr. 16, 2012 (DE) .......... 10 2012 206 195
Aug. 10, 2012 (DE) .......... 10 2012 214 223

(51) Int. Cl.
*F16D 25/12* (2006.01)
*F16D 29/00* (2006.01)
(Continued)

(52) U.S. Cl.
CPC ............... *F16D 25/14* (2013.01); *F15B 7/08* (2013.01); *F15B 7/10* (2013.01); *F16D 29/005* (2013.01);
(Continued)

(58) Field of Classification Search
CPC ...... F16D 25/14; F16D 29/005; F16D 48/064; F16D 2500/3026; B60T 11/22; F15D 7/08; F15D 7/10
(Continued)

(56) References Cited

U.S. PATENT DOCUMENTS 7,059,128 B2 *  6/2006  Rammhofer .......... F16D 25/088
                                                          60/588
7,350,634 B2 *  4/2008  Baehr ................... F16D 29/005
                                                          192/110 R
(Continued)

FOREIGN PATENT DOCUMENTS

CN          201137653          10/2008
CN          102105716          6/2011
(Continued)

*Primary Examiner* — Terry Chau
(74) *Attorney, Agent, or Firm* — Simpson & Simpson, PLLC (57) ABSTRACT

An actuator system for hydraulic actuation of a clutch comprises a master cylinder with a master piston, a readjustment container for containing hydraulic fluid, a connection opening between the readjustment container and the master cylinder, where a degree of openness of the connection opening is dependent on the position of the master piston, and a hydraulic actuator to control a position of the master piston. In an actuator system, a control device for controlling the hydrostatic actuator is also provided, such that a speed of motion of the master piston is high while the connection opening is wide open, and low while the connection opening is open a little. In a method according to the disclosure, a position of the master piston is detected, and the actuator is controlled at different speeds depending on the position or the degree of openness.

6 Claims, 4 Drawing Sheets

(51) Int. Cl.
    *F16D 48/06*     (2006.01)
    *F15B 7/08*     (2006.01)
    *F15B 7/10*     (2006.01)
    *F16D 48/02*     (2006.01)

(52) U.S. Cl.
    CPC .... *F16D 48/064* (2013.01); *F16D 2500/3026* (2013.01)

(58) Field of Classification Search
    USPC ............................................ 60/588; 92/85 B
    See application file for complete search history.

(56) References Cited

U.S. PATENT DOCUMENTS

| | | | |
|---|---|---|---|
| 8,548,705 B2 * | 10/2013 | Eich .................... | F16D 48/066 180/242 |
| 2004/0188218 A1 * | 9/2004 | Berger et al. .................. | 192/90 |
| 2004/0231443 A1 * | 11/2004 | Vornehm et al. .............. | 74/335 |
| 2009/0218190 A1 * | 9/2009 | Reuschel ............. | F16D 25/088 192/85.63 |

FOREIGN PATENT DOCUMENTS

| | | | |
|---|---|---|---|
| CN | 102261396 | | 11/2011 |
| DE | 19734038 | A1 * | 2/1998 |
| DE | 102010047800 | A1 | 5/2011 |
| DE | 102010047801 | A1 | 5/2011 |
| GB | 2317933 | | 4/1998 |
| GB | 2317933 | A * | 4/1998 |
| GB | 2329227 | A * | 3/1999 |

* cited by examiner

ACTUATOR SYSTEM FOR HYDRAULIC ACTUATION

CROSS-REFERENCE TO RELATED APPLICATIONS

The present application is the U.S. national stage application pursuant to 35 U.S.C. §371 of International Application No. PCT/EP2013/056281, filed Mar. 25, 2013, which application claims priority from German Patent Application Nos. DE 10 2012 206 195.9, filed Apr. 16, 2012, and DE 10 2012 214 223.1, filed Aug. 10, 2012, which applications are incorporated herein by reference in their entireties.

TECHNICAL FIELD

The disclosure relates generally to an actuator system for the hydraulic actuation of a clutch in a drivetrain of a motor vehicle. In particular, the disclosure relates to a control for a hydrostatic actuator of the actuator system.

BACKGROUND

An actuator system for hydraulic actuation of a clutch includes a hydrostatic actuator, as known for example from German Patent Application Nos. DE 10 2010 047 800 A1 or DE 10 2010 047 801 A1. An actuator of this sort actuates a master piston in a master cylinder, in order to exchange a hydraulic fluid with a slave cylinder by means of a pressure line. The slave cylinder includes a slave piston, which actuates the clutch.

In one embodiment, two clutches are provided in the drivetrain, which operate on different transmission shafts, with only one of the clutches being engaged at a time. It is usual here that the clutch transmits power into the drivetrain when the pressure in the slave cylinder is sufficiently high. An inverted embodiment, in which a clutch transmits power into the drivetrain when the pressure in the slave cylinder is low, is known from a clutch system that has just one clutch.

A position of the master piston is coupled to the position of the clutch, but this coupling is subject to a number of influencing factors. For example, the clutch system, in particular the hydraulic fluid, may heat up during operation, which causes it to expand, or a pressure of the hydraulic fluid increases. Conversely, a cooling of the clutch system may result in a reduced volume or pressure of the fluid. In order to balance out such effects, it is usual to periodically connect the hydraulic fluid, which is closed off in the region between the pistons, to a readjustment container by means of an equalizing opening ("sniffing"), in order to balance out underpressure or overpressure. To that end, a connection opening is provided between the readjustment container and the master cylinder, which is released when the master piston is in the so-called sniffing position. However, as the connection opening is closed from the sniffing position, the hydraulic pressure already rises before the connection opening is completely closed. During this phase, a quantity of hydraulic fluid is exchanged between the readjustment container and the master cylinder, which depends on a flow resistance of the hydraulic fluid. However, the flow resistance is dependent on the temperature of the fluid, among other things, so that after the connection opening is closed a predetermined volume or predetermined pressure of the hydraulic fluid in the actuator system cannot be guaranteed.

SUMMARY

According to aspects illustrated herein, there is provided a method for controlling an actuator system for hydraulic actuation of a clutch, wherein the actuator system has a master cylinder with a master piston, a readjustment container to receive hydraulic fluid, a connection opening between the readjustment container and the master cylinder, a hydrostatic actuator to control a position of the master piston and a control device to control the hydrostatic actuator, and a degree of openness of the connection opening is dependent on a position of the master piston, comprising the following steps: controlling the actuator at a high speed, while the connection opening is completely closed, and controlling the actuator at a low speed, while the connection opening is between fully closed and fully open.

The object of the disclosure is to specify a method and a system which allows working conditions of a hydraulic actuator system to be adjusted with improved precision as rapidly as possible. The disclosure fulfills this object by means of a method and an actuator system having the features of the independent claims. Subordinate claims describe preferred embodiments.

According to aspects illustrated herein, there is provided an actuator system for hydraulic actuation of a clutch comprises a master cylinder with a master piston, a readjustment container for receiving hydraulic fluid, a connection opening between the readjustment container and the master cylinder, where a degree of openness of the connection opening is dependent on the position of the master piston, and a hydraulic actuator to control a position of the master piston. In an actuator system according to the disclosure, a control device for controlling the hydrostatic actuator is also provided, such that a speed of motion of the master piston is high while the connection opening is completely closed, and low and/or zero while the connection opening is wide open. In a method according to the disclosure, a position of the master piston is detected, and the actuator is controlled at different speeds depending on the position or the degree of openness.

This makes it possible to move the master piston at a decreasing speed during the sealing of the connection opening, which guarantees a rapid buildup of pressure overall, but a sufficiently slow buildup of pressure during the sealing of the connection opening, so that a volume or a pressure of the hydraulic fluid in the cylinders after the closing of the connection opening corresponds with improved precision to a predetermined value.

Outside of the range in which the connection opening is at least partially open, the speed of motion of the master piston can in principle be arbitrary. In particular, the speed of motion can be higher when the connection opening is closed than when the connection opening is partially opened. This enables a sniffing procedure to be performed more rapidly. An actuator system can thus be calibrated more quickly, in order by means of the clutch to enable a precise engagement or disengagement, and thus a precise and harmonic gear-change process of a connected transmission.

In an exemplary embodiment, the maximum speed of movement rises consistently in the region of the only partially opened connection opening, as the degree of openness increases. This makes it possible to ensure, in a further-improved way, that the pressure equalization intended by the sniffing procedure occurs both quickly and with precise definition. Various dependencies of the speed of movement on the degree of openness are possible here.

In one embodiment, the dependency is linear. In this way, accelerations of the hydrostatic actuator or of the master piston can be kept small. Furthermore, in this way the actuator can be addressed more easily. In another embodiment, the dependency on one or more segments of the region is always constant. When multiple segments are used, a stair-step pattern of the speed of movement can be realized, which can likewise be easily implementable. In particular, the hydrostatic actuator can be easily addressed for movement at various predetermined speeds.

In another embodiment, the speed of movement of the master piston in the region of the only partially opened connection opening can be controlled depending on a temperature in the region of the hydraulic fluid. The temperature used may be the direct temperature of the hydraulic fluid, or a temperature on the basis of which the temperature of the hydraulic fluid can be approximated with sufficient precision, for example an ambient temperature in the region of the slave cylinder, such as a clutch temperature. Here the speed of movement of only one of the segments described above, or of several or all segments, may be controlled depending on the temperature. The higher the temperature, the higher the speed of the segments.

To ensure that the master piston is moved for the sniffing procedure into an opening position which does not release the connection opening any more than is necessary for the sniffing procedure, the opening position can be adjustable. In one embodiment of the method, the master piston is moved into an opening position in which the connection opening is partially open, which determines that a pressure of the hydraulic fluid drops to an ambient pressure more slowly than predetermined, and thus adjusts the opening position so that the degree of openness is enlarged. In the following, the master piston can only be moved on one side of the opening position in order to actuate the clutch.

Through the described procedure, the opening position of the master piston can be calibrated to a value which, allows a sufficiently rapid pressure equalization between the readjustment container and the master cylinder, yet, avoids an unnecessary movement of the master piston, and in the event of an elevated pressure of the hydraulic fluid due to other reasons, for example thermal, counteracts a shift of the position in which the connection opening is released.

In another embodiment, it is possible to determine that a sensing position of the master piston, at which the clutch begins to engage as the pressure rises, is shifted in the direction of a closed position of the master piston, at which the connection opening is just closed. The opening position can thereupon be adjusted so that the degree of openness of the connection opening is enlarged. Subsequently, the master piston can only be moved on one side of the opening position in order to actuate the clutch.

In the two variants it is possible, in special situations, for example when filling the actuator system with hydraulic fluid, to move the master piston into a position in which the connection opening is released further than it would be in normal operation, or completely so.

In yet another embodiment, a closed position ("closure point") of the master piston, at which the connection opening is closed, can be determined on the basis of a pressure pattern of the hydraulic fluid, when the master piston is moved in the direction of a decreasing degree of openness. Subsequently, the master piston can only be moved on one side of the determined closed position in order to actuate the clutch. It is thereby possible to prevent an unacceptably high pressure buildup from occurring when closing the connection opening, before the closed position is reached. In an exemplary embodiment, it is only necessary to check whether the pressure of the hydraulic fluid is above a predetermined threshold value, while the master piston is beyond an uncertainty zone in which the actual closed position lies. This can allow the use of an advantageously simply constructed pressure sensor for the pressure of the hydraulic fluid.

BRIEF DESCRIPTION OF THE DRAWINGS

Various embodiments are disclosed, by way of example only, with reference to the accompanying drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
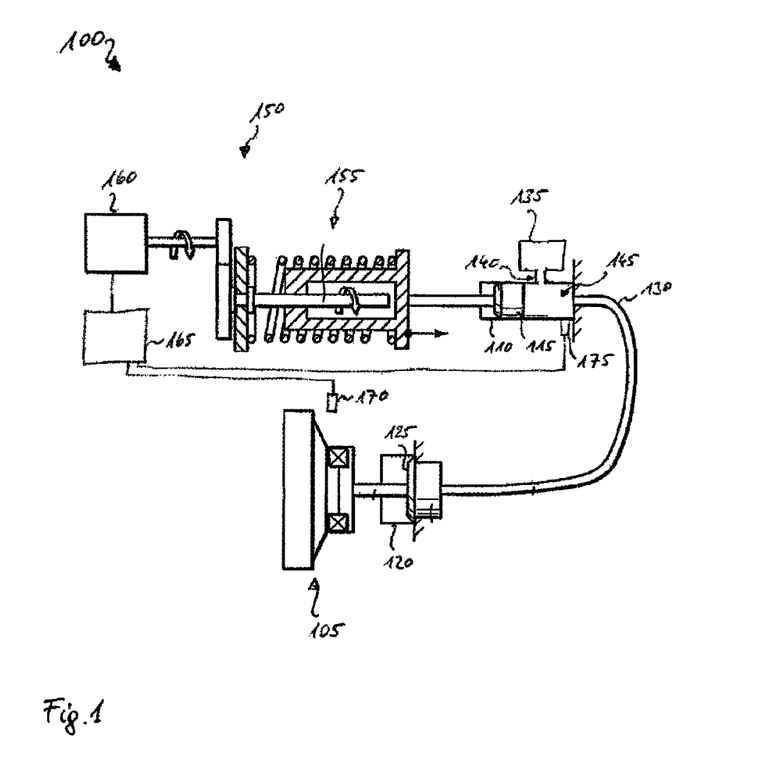
FIG. 1 is a schematic view of an actuator system for hydraulic actuation of a clutch.

FIG. 1 shows an actuator system 100 for hydraulic actuation of a clutch 105. The clutch 105 is intended for controlled engagement or interrupting of a flow of power in a drivetrain, in particular of a motor vehicle. In a preferred embodiment, a plurality of clutches 105 are provided in the drivetrain, where at every point in time a maximum of one of the clutches is completely engaged.

The actuator system 100 comprises a master cylinder 110, in which a master piston 115 is accommodated, a slave cylinder 120, in which a slave piston 125 is accommodated, a pressure line 130 for fluid connection of the cylinders 110 and 120, and a readjustment container 135, which can be fluidly connected to the master cylinder 110, depending on a position of the master piston 115 by means of a connection opening 140 in the master cylinder 110. In the readjustment container 135, the master cylinder 110, the pressure line 130 and the slave cylinder 120 there is a hydraulic fluid 145. The readjustment container 135 is not sealed pressure-tight relative to an environment, so that the hydraulic fluid 145 in the readjustment container 135 is at ambient pressure, in general an ambient air pressure.

In the depicted embodiment, it is assumed that a pressure of the hydraulic fluid 145 can be elevated by moving the master piston 115, in order to engage the clutch 105 or to produce a flow of power through the clutch 105 in the drivetrain. An inverted arrangement, in which the clutch 105 is engaged by means of spring force when the pressure of the hydraulic fluid 145 drops, is also possible.

The master piston 115 can be moved by means of a hydrostatic actuator 150, by shifting the position of the master piston 115 in the master cylinder 110 by means of the actuator 150. To that end, the actuator 150 preferably includes a spindle drive 155 to convert a rotational into a linear position, a drive motor 160 to provide the rotational position, and a control device 165, which may also be provided separate from the actuator 150. The control device 165 is preferably connected to a first sensor 170 to determine a temperature in the region of the hydraulic fluid 145, and/or to a second sensor 175 to determine a pressure of the hydraulic fluid 145 in the region of the pressure line 130.

In order to disengage and engage the clutch 105 in a normal operation, the actuator 150 is addressed to move the master piston 115 in the master cylinder 110 in such a way that the connection opening 140 is closed, and the requisite pressure of the hydraulic fluid 145 for disengaging or engaging is provided through the position of the master piston 115. If the master piston 115 is in a position in which the pressure of the hydraulic fluid 145 is low in normal operation, then the master piston 115 in FIG. 1 can be moved still further to the left, in order to at least partially release the connection opening 140 in conjunction with a so-called sniffing procedure, and to enable an exchange of hydraulic fluid 145 between the master cylinder 110 and the readjustment container 135. The sniffing procedure may be necessary if a temperature of the hydraulic fluid 145 has changed since a previous sniffing procedure. By means of the sniffing procedure the actuator system 100 is recalibrated hydraulically or mechanically, in order to establish a predetermined correlation between the position of the actuator 150 and the position of the clutch 105.

Figure 2:
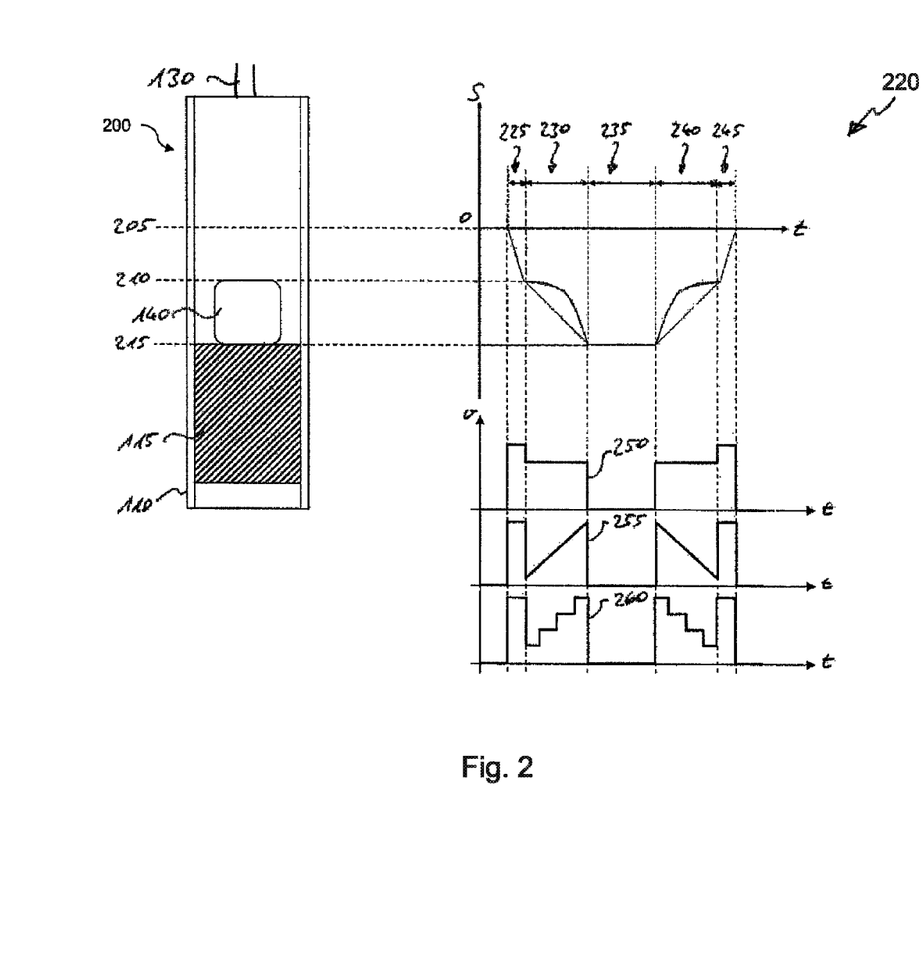
FIG. 2 is a diagram of the correlations between a position and a maximum speed of movement of a master piston in the actuator system from FIG. 1.

FIG. 2 shows correlations 200 between a position and a maximum speed of movement of the master piston 115 of the actuator system 100 from FIG. 1; the left-hand area depicts functionally a section of the master cylinder 110 with the master piston 115 and the connection opening 140. In the right-hand area at the top a correlation is depicted between the position of the master piston 115 in the vertical direction and the time in the horizontal direction. Further down in the right-hand area, three alternative patterns of movement speeds of the master piston 115 in the master cylinder 110 are depicted. Broken lines simplify assignments between segments of the three depictions.

In normal operation, the upper edge of the master piston 115 in FIG. 2 is in a zero position 205, in which the slave cylinder 120 is under a minimum pressure. In order to actuate the clutch 105, the master piston 115 is moved upward from the zero position 205 in FIG. 2. For sniffing, the master piston 115 on the other hand is moved downward into a closed position 210, in which the connection opening 140 is still completely closed. The master piston 115 is then moved further past the closed position 210 into an opening position 215, in which the connection opening 140 is released sufficiently to the readjustment container 135. In the depiction in FIG. 2, the opening position 215 is depicted with a maximum possible degree of openness of the connection opening 140, without restriction of the generality. In other embodiments, the opening position 215 can also be defined further above with reference to the depiction in FIG. 2. The opening position 215 can also be variably definable, in order to allow an optimized sniffing procedure.

According to the disclosure, the speed of movement of the master piston 115 is controlled depending on its position in the master cylinder 110. A pattern 220 explains the correlation between speed of movement and position of the master piston. In a first time segment 225 the sniffing is prepared, by moving the master piston 115 from the zero position 205 into the closed position 210. In a second time segment 230 the master piston 115 is moved further in the direction of the opening position 215, so that the connection opening 140 is partially opened and a degree of openness of the connection opening 140 then increases. In a third time segment 235 the master piston 115 is held in the opening position 215. The greatest part of the pressure equalization between the interior space of the master cylinder 110 and the readjustment container 135 takes place in this segment. After that, in a segment 240, the connection opening 140 is closed again by means of the master piston 115, until the master piston 115 has reached the closed position 210. The movement in segment 240 preferably corresponds to the time-reversed procedure in segment 230. In a fifth time segment 245 the master piston 115 is moved again from the closed position 210 into the zero position 205. This segment corresponds to the time-reversed segment 225.

While the speed of movement of the master piston 115 is high in segment 225, when the connection opening 140 is fully closed, the speed of movement is lower in segment 230, when the connection opening 140 is between fully closed and fully open. In one embodiment the speed of movement can also be controlled on the basis of a temperature of the temperature sensor from FIG. 1, in particular in segment 230. If the temperature is high, then the speed of movement can be higher than when the temperature is low, in order to take account of a temperature-dependent viscosity of the hydraulic fluid 145.

Three alternative exemplary speed patterns 250, 255 and 260 explain a speed control of the master piston 115, which depends on the degree of openness of the partially released connection opening 140. Outside of the segments 230 and 240, in which the connection opening 140 is either completely open or completely closed, a suitable speed of the master piston 140 can be achieved in a known way.

In the first pattern 250, the speed of movement of the master piston 115 in segment 230 is below that in segment 225, the speed of movement in segment 230 being constant.

In the second pattern 255, the speed of movement of the master piston 115 in segment 230 increases in a straight line as the degree of openness of the connection opening 140 rises. The speed of the master piston 115 at the opening position 215 can be as high as the speed in segment 225, or also lower.

In the third pattern 260, the speed of the master piston 115 in segment 230 is controlled in multiple segments, each with constant speed, depending on the degree of openness of the connection opening 140. The result is the step-like speed pattern 260 which is shown. Here two, three or more constant speeds of the master piston 115 can be controlled one after the other.

In other embodiments, still other speed patterns of the master piston 115 are possible in segment 230. In an exemplary embodiment, the speed pattern is consistent.

In the fourth segment 240, the master piston 115 is preferably moved at a speed which, as shown, corresponds to the respective pattern in segment 230 in reversed time sequence.

Figure 3:
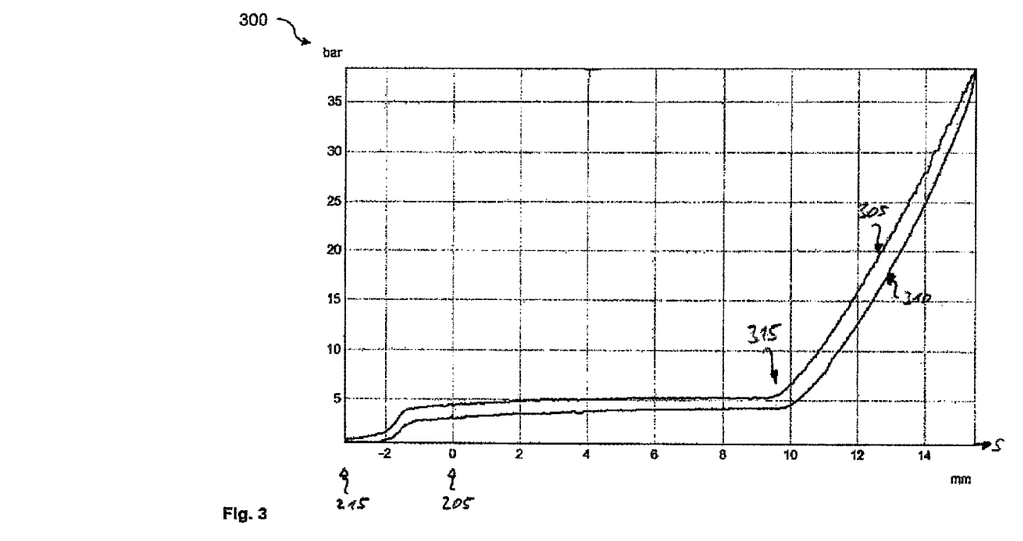
FIG. 3 is a diagram of a correlation between the position of a master piston and a pressure of hydraulic fluid in the actuator system from FIG. 1; and, FIG. 4 is an enlarged view of the correlation shown in FIG. 3.

FIG. 3 shows a correlation 300 between the position of the master piston 115 and a pressure of the hydraulic fluid 145 of the actuator system in FIG. 1. A pressure of the hydraulic fluid 145 is depicted in the vertical direction, and a position of the master piston 115 in the horizontal direction. The correlation shown is exemplary, and the indicated scale values are examples.

A first pattern 305 corresponds to a movement of the master piston 115 in the positive direction, i.e., toward the right in FIG. 3, while a second pattern 310 corresponds to a movement of the master piston 115 in the negative direction, i.e., toward the left in FIG. 3. The different patterns 305, 310 result during a clutch actuation from a hysteresis effect based on friction in the real actuator system 100 in FIG. 1.

At a position of the master piston 115 at approximately 10 mm there is a contact point 315, at which an actuation of the clutch 105 begins or ends, i.e., a frictional lock is engaged by means of the clutch 105 when the hydrostatic actuator 150 is actuated, or is interrupted as the actuation decreases. To be able to precisely control the disengaging or engaging of the clutch 105, it is necessary to know the contact point 315 as precisely as possible in reference to the position of the master piston 115. If the hydraulic fluid 145 warms up after the connection opening 140 was closed during a sniffing procedure, the patterns 305 and 310 shift to the left. A shifting of this sort may also have other causes, for which reason the shifting cannot yet be compensated for solely on the basis of the temperature of the hydraulic fluid 145. Instead, the shifting can be eliminated by freeing the hydraulic fluid 145 of over- or under-pressure when the master piston 115 is moved into the sniffing position in segment 230 in FIG. 2.

Figure 4:
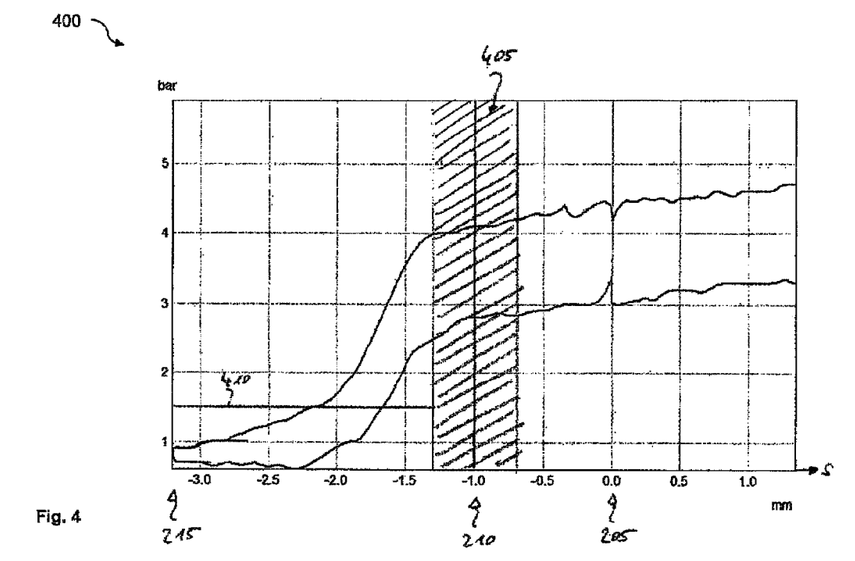

FIG. 4 shows an enlarged detail of the correlation shown in FIG. 3. Here the closed position 210 is assumed to be in the position −1.0 mm. However, the closed position 210 lies within an uncertainty zone 405, since an elevated pressure in the region of the closed position 210, for example, may result in a deformation of a seal at the connection opening 140, so that the actual closed position 210 during operation of the actuator system 100 may vary in its position relative to the master cylinder 110.

In order to place the opening position 215 at a position of the master piston 215 at which an adequate release of the connection opening 140 is just guaranteed, various approaches may be followed. In a first variant, the pressure of the hydraulic fluid 145 is observed in the opening position 215. If the pressure drops more slowly than a predetermined speed to the pressure in the readjustment container 135, then the opening position 215 is set further to the left in FIG. 4. This change relates to an internal parameter of the control device 165.

In a second variant, the opening position 215 can be adjusted on the basis of a temperature of the hydraulic fluid 145, so that the opening position 215 corresponds to a smaller degree of openness when the hydraulic fluid 145 is hot than when the hydraulic fluid 145 is cold.

To ensure further that no unacceptably high pressure of the hydraulic fluid 145 remains in the pressure line 130 when the connection opening 140 in segment 240 in FIG. 2 is closed, the pressure sensor 175 from FIG. 1 may also be used in order to adjust the closed position 210 accordingly. In one embodiment, the closed position 210 may be adjusted if the master piston 115 is positioned below, or in FIG. 4 to the left of the depicted uncertainty zone 405, and a predetermined threshold value 410 for the pressure is exceeded.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMBERS 100 actuator system
105 clutch
110 master cylinder
115 master piston
120 slave cylinder
125 slave piston
130 pressure line
135 readjustment container
140 connection opening
145 hydraulic fluid
150 hydrostatic actuator
155 spindle drive
160 drive motor
165 control device
170 first sensor
175 second sensor
200 correlation
205 zero position
210 closed position
215 opening position
220 pattern
225 first segment
230 second segment
235 third segment
240 fourth segment
245 fifth segment
250 first speed pattern
255 second speed pattern
260 third speed pattern
300 correlation
305 first pattern
310 second pattern
315 contact point
405 uncertainty zone
410 threshold value

The invention claimed is:

1. A method for controlling an actuator system for hydraulic actuation of a clutch, wherein the actuator system has a master cylinder with a master piston, a readjustment container to receive hydraulic fluid, a connection opening between the readjustment container and the master cylinder, a hydrostatic actuator to control a position of the master piston and a control device to control the hydrostatic actuator, and a degree of openness of the connection opening is dependent on the position of the master piston, the method comprising the steps of:
  controlling the actuator at a first constant speed, while the connection opening is fully closed by the master piston; and,
  controlling the actuator at a plurality of speed steps in a sequence to displace the master piston to fully open the connection opening, wherein:
    an initial speed step begins at a point at which the master piston begins to open the connection opening; and,
    each speed step in the sequence of the speed steps increases over a respective speed step preceding said each speed step in the sequence.

2. The method of claim 1, wherein the speed of movement when the connection opening is only partially open is lower than when the connection opening is closed.

3. The method of claim 1, further comprising the steps of:
moving the master piston into an opening position in which the connection opening is partially opened;
determining that a pressure of the hydraulic fluid is decreasing to an ambient pressure more slowly than predetermined;
adjusting the opening position so that the degree of openness of the connection is enlarged; and,
moving the master piston past a closed position in which the connection opening is completely closed in order to actuate the clutch.

4. The method of claim 3, further comprising the steps of:
determining that a contact point of the master piston at which the clutch begins to engage is shifted in the direction of the closed position of the master piston at which the connection opening is just closed.

5. The method of claim 4, further comprising the steps of:
moving the master piston in the direction of a decreasing degree of openness;
determining the closed position at which the connection opening is just closed, on the basis of a pressure pattern of the hydraulic fluid.

6. An actuator system for hydraulic actuation of a clutch, comprising:
a master cylinder with a master piston;
a readjustment container to receive hydraulic fluid;
a connection opening between the readjustment container and the master cylinder, wherein a degree of openness of the connection opening is dependent on a position of the master piston; and,
a hydraulic actuator for controlling a position of the master piston, and including a control device, wherein:
the control device is for controlling the hydraulic actuator in such a way that the master piston is moved at a plurality of speed steps in a sequence;
a final speed step in the sequence terminates at a point at which the master piston fully closes the connection opening;
each speed step in the sequence of the speed steps decreases over a respective speed step preceding said each speed step in the sequence;
the control device is for controlling the hydraulic actuator such that the master cylinder is moved at a first constant speed while the connection opening is fully closed; and,
the first constant speed follows the final speed step.

* * * * *